(12) United States Patent
Oda et al.

(10) Patent No.: US 6,332,691 B2
(45) Date of Patent: *Dec. 25, 2001

(54) SURFACE LIGHT SOURCE DEVICE, AND LIQUID CRYSTAL DISPLAY DEVICE, SIGN DISPLAY APPARATUS AND TRAFFIC SIGN DISPLAY APPARATUS USING THE SURFACE LIGHT SOURCE DEVICE

(75) Inventors: Masaharu Oda; Issei Chiba; Yasuko Hayashi, all of Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/834,899

(22) Filed: Apr. 16, 2001

Related U.S. Application Data

(62) Division of application No. 09/461,342, filed on Dec. 15, 1999, now Pat. No. 6,244,719, which is a continuation of application No. 09/117,505, filed as application No. PCT/JP97/00237 on Jan. 31, 1997, now Pat. No. 6,099,135.

(30) Foreign Application Priority Data

Feb. 1, 1996 (JP) ........................................................ 8-16928
Feb. 1, 1996 (JP) ........................................................ 8-40719
Jul. 4, 1996 (JP) ........................................................ 8-175122

(51) Int. Cl.$^7$ ..................................................... F21V 8/00
(52) U.S. Cl. ................................ 362/31; 362/29; 362/32; 362/26; 362/302
(58) Field of Search ........................... 359/599; 362/31, 362/29, 32, 26, 302, 309; 385/36, 37, 901

(56) References Cited

U.S. PATENT DOCUMENTS

| 5,550,676 | 8/1996 | Ohe et al. ........................ 359/599 |
| 5,627,926 | 5/1997 | Nakamura et al. .................... 385/36 |
| 5,718,497 | 2/1998 | Yokoyama et al. ..................... 362/31 |

FOREIGN PATENT DOCUMENTS

| 1-107406 | 4/1989 | (JP) . |
| 1-244490 | 9/1989 | (JP) . |
| 1-245220 | 9/1989 | (JP) . |
| 1-252933 | 10/1989 | (JP) . |
| 2-17 | 1/1990 | (JP) . |
| 2-84618 | 3/1990 | (JP) . |
| 2-176629 | 7/1990 | (JP) . |
| 6-18879 A | 1/1994 | (JP) . |
| 6-208113 | 7/1994 | (JP) . |
| 6-331827 | 12/1994 | (JP) . |
| 7-5464 | 1/1995 | (JP) . |
| 7-294745 | 11/1995 | (JP) . |
| 8-15530 | 1/1996 | (JP) . |

Primary Examiner—Mohammad Sikder
(74) Attorney, Agent, or Firm—Morgan, Lewis & Bockius LLP

(57) ABSTRACT

A surface light source device, comprising a light source (2); a light conductor (1) which has a light incident face (11) on at least one side end surface thereof which confronts the light source (2), and a light emitting face (12) on one surface thereof which is substantially perpendicular to the light incident face (11); and a light angle varying sheet (3) which is disposed at a side of the light emitting face (12) of the light conductor (1), wherein at least one of the light emitting face (12) and a back surface (13) of the light conductor (1) comprises a minute structure having an average slant angle of 0.5 to 7.5 degrees. The light angle varying sheet (3) may comprise a prism sheet having a plurality of prisms (31) which are formed parallel to one another on at least one surface thereof. The minute structure may comprise a roughened surface which includes a plurality of fine convex members each having a substantially spherical surface or a plurality of prism arrays having slant surfaces which extend parallel to said light incident face (11) and which have an average slant angle of 0.5 to 7.5 degrees.

16 Claims, 6 Drawing Sheets

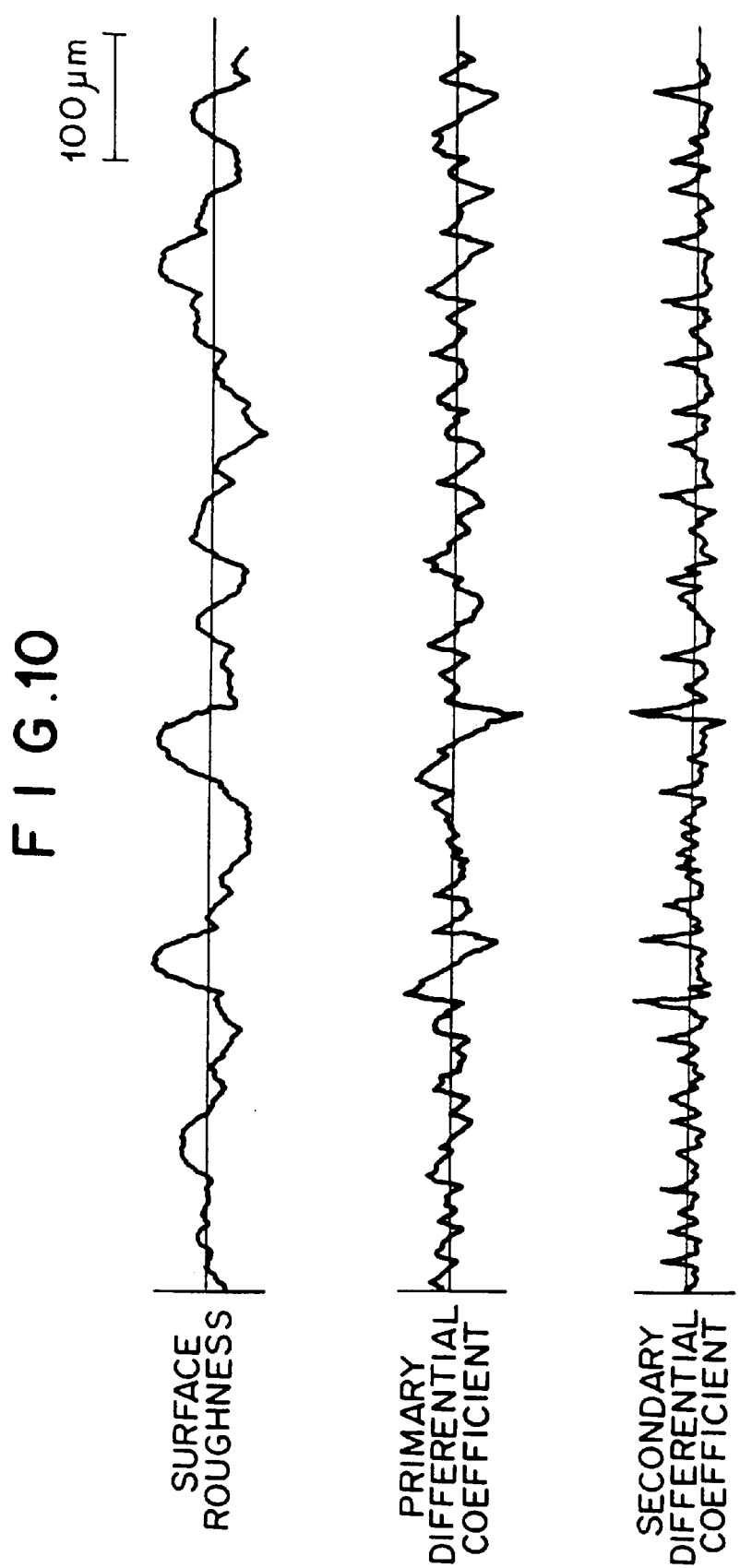

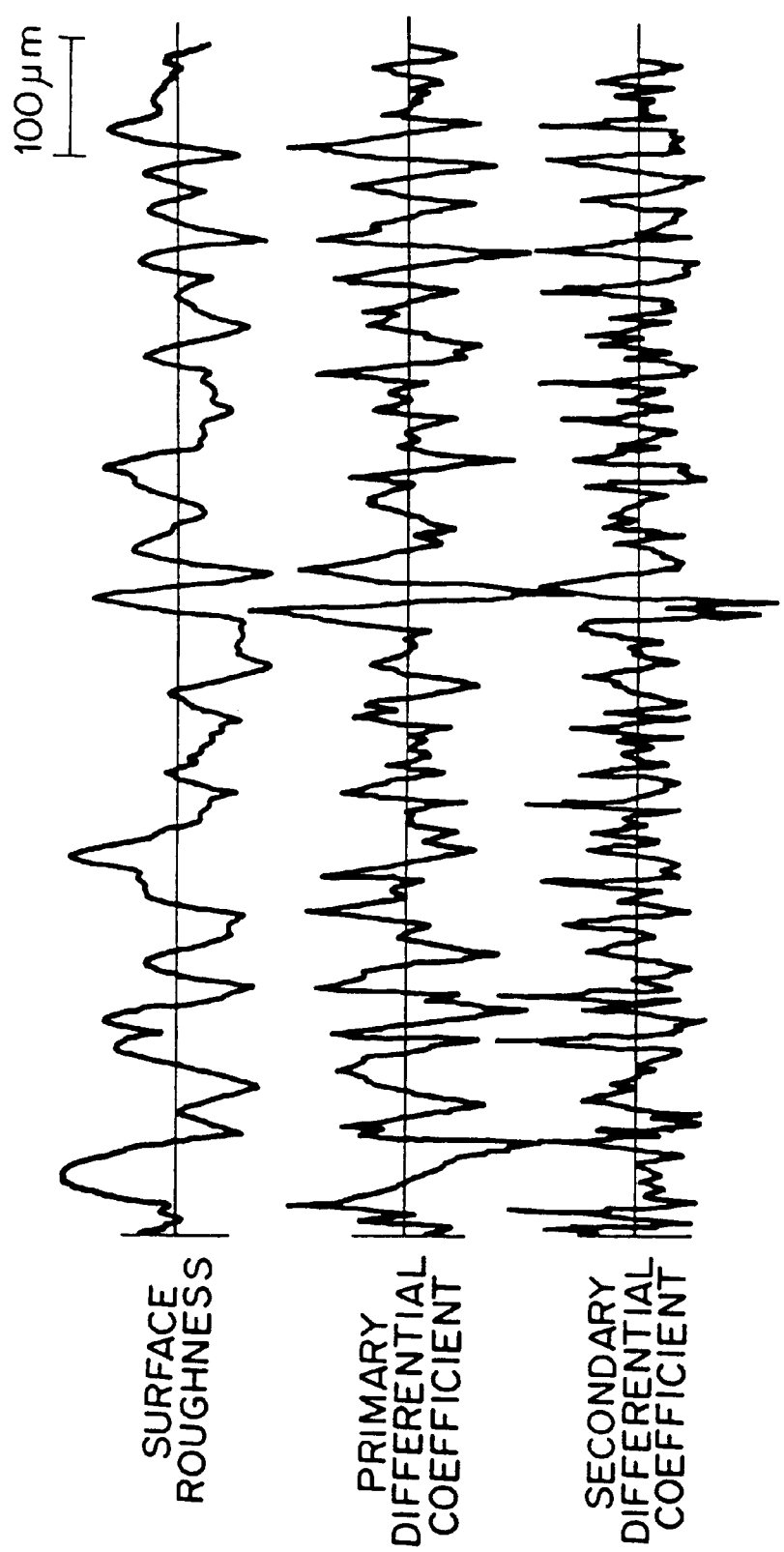

SURFACE LIGHT SOURCE DEVICE, AND LIQUID CRYSTAL DISPLAY DEVICE, SIGN DISPLAY APPARATUS AND TRAFFIC SIGN DISPLAY APPARATUS USING THE SURFACE LIGHT SOURCE DEVICE

This Application is a Divisional of Ser. No. 09/461,342 filed Dec. 15, 1999, U.S. Pat. No. 6,244,719 which is a continuation of Ser. No. 09/117,505 filed Jul. 30, 1998 U.S. Pat. No. 6,099,135, which is a 371 of PCT/JP97/00237 filed Jan. 31, 1997.

FIELD OF THE INVENTION

The present invention relates to a surface light source device for a display apparatus such as a liquid crystal display device for use in a portable personal computer, a liquid crystal television or the like; a sign display apparatus such as a guide marking board, a large-size signboard or the like used in a station, public facilities or the like; or for a traffic sign display apparatus such as various types of guide signs, traffic signs or the like on a highway road or a general road; and the present invention relates more particularly to a surface light source element for emitting light which has high brightness and a uniform brightness distribution on a light emitting plane without performing any uniformity-enhancing processing such as treatment with a spot pattern or the like.

DESCRIPTION OF THE RELATED ART

Recently, a color liquid crystal display device has been widely used in various applications such as in portable personal computers, liquid crystal televisions, video built-in type liquid crystal televisions, etc. This liquid crystal display device comprises a back light portion and a liquid crystal display portion. An under-lighting system in which a light source is disposed just under the liquid crystal display portion and an edge-lighting system in which a light source is disposed on the side surface of a light conductor are used as a lighting system for the back light portion.

Recently, the edge-lighting system has been more frequently used because it is more suitable for reducing the size of the liquid crystal display device. In the edge-lighting system, the light source is disposed at a side surface portion of a planar light conductor so as to emit light from the entire surface of the light conductor, and thus the back light portion using this system is called a "surface light source device".

According to such a surface light source device, a light conductor is formed of a planar transparent member such as an acrylic resin plate or the like, and light emitted from a light source which is disposed at the side surface of the light conductor is introduced through the side surface (light incident face) of the light conductor into the light conductor. The incident light totally (completely) reflects from the obverse surface of the light conductor (light emitting face) and the back surface of the light conductor and then passes through the light conductor. Further, a light emitting function or light emitting portion such as a light scattering portion is provided on the obverse surface or back surface of the light conductor to emit the light from the whole light emitting face. However, when the light emitting portion is uniformly formed on the obverse surface or the back surface of the light conductor, the brightness of the emitted light is more reduced as the light is farther away from the light source, so that the brightness distribution on the light emitting plane becomes disuniform and thus a high-quality display image cannot be obtained.

This result is more noticeable as the size of the liquid crystal display device increases, and thus the surface light source device cannot practically be used for a large-size liquid crystal display device of 10-inches or more in size. Despite this, large-size liquid crystal display devices have recently been in demand and, following this recent demand, liquid crystal display devices used for portable personal computers, liquid crystal televisions or the like have additionally been required to have a brightness distribution of very high uniformity on the screen thereof.

Furthermore, marking apparatuses such as a guide signboard or a large-size signboard, and traffic sign apparatuses such as a guide sign, a traffic signboard or the like, have used two illumination systems, i.e., an internal illumination system and an external illumination system, to enhance visual recognition and character recognition at night. According to the internal illumination system, characters, figures, photographs, etc., are formed on a semi-transparent plastic plate such as a methacrylate plate or the like by cut-out, print or the like to form a display plate. A light source is disposed at the inside of the display plate, and the display plate is illuminated by the light source. A rod (linear pipe shape) or annular type fluorescent lamp is generally used as the light source. According to the external illumination system, a light source is disposed at any of the upper and lower sides or right and left sides of a display plate on which an information display is formed, and the whole surface of the display plate is illuminated by the light source. A rod type fluorescent lamp is generally used as the light source.

In the conventional display devices as described above, the brightness distribution on the entire surface of the display plate is disuniform, that is, the ratio of the maximum value/minimum value of the brightness is very large. Therefore, it is very difficult to provide a display device having an uniform brightness distribution by using these illumination systems. In particular, this problem is more serious for the external illumination system. Further, the internal illumination system has another problem in that a fluorescent lamp or the like which is used as the light source can be unintentionally seen through the display plate (i.e., a see-through phenomenon occurs).

Therefore, attempts have been made to apply the edge lighting type back light system in which a light source is disposed at the side surface portion of a planar light conductor to emit light from the entire surface of the light conductor to the display devices as described above. However, these display devices need a large-size surface light source device, and thus they have the same problem as the liquid crystal display device in that sufficient uniformity in brightness cannot be obtained within the light emitting face.

In order to solve this problem of "disuniformity of brightness" of the surface light source device, various proposals have been made. For example, Japanese Laid-open Patent Application No. Hei-1-245220 proposes a surface light source device having a light emitting portion which is obtained by coating or sticking light scattering material to the back surface confronting the light emitting face of the light conductor so that the density of the light scattering material increases with increasing distance from the light incident face. Further, Japanese Laid-open Patent Application No. Hei-1-107406 proposes a light conductor comprising plural laminated transparent plates on which fine spots formed of light scattering material are formed in various patterns. In such a surface light source device, since white pigment such as titanium oxide, barium sulfate or the like is used as the light scattering material, optical loss occurs due to light absorption or the like when the light impinging against the light scattering material is scattered. Therefore, although uniformity of the brightness distribution can be achieved, the brightness of the emitted light is reduced.

Further, Japanese Laid-open Patent Application No. Hei-1-244490 and Japanese Laid-open Patent Application No. Hei-1-252933 propose a surface light source device in which an emitted light adjusting member or a light diffusion plate having a light reflection pattern which is matched to the reciprocal of a light emission distribution is disposed on the light emitting face of the light conductor. However, in such a surface light source device, since the light reflected from the emitted light adjusting member or the light diffusion plate can not be reused, the same optical loss also occurs. Therefore, the brightness of the emitted light in a desirable direction is reduced.

Still further, Japanese Laid-open Patent Application No. Hei-2-17 and Japanese Laid-open Patent Application No. Hei-2-84618 propose a surface light source device in which a satin-finished face is or many lens units are formed on at least one of the light emitting face or the back surface confronting the light emitting face of the light conductor, and a prism sheet is mounted on the light emitting face. In such a surface light source device, the brightness of the emitted light is very high, however, the uniformity of the brightness distribution on the light emitting face is still unsatisfactory. Therefore, this type of surface light source device is practically usable as only a small-size surface light source element in a size of several inches.

In order to provide a surface light source device, which can achieve uniformity in brightness of emitted light and reduce the optical loss to enhance the brightness, Japanese Laid-open Patent Application No. Hei-6-18879 proposes the following surface light source device. In this surface light source device, a satin-finished face is or many lens units are formed on the light emitting face of the light conductor, a roughened surface portion and a flat surface portion are formed on the back surface of the light conductor so that the ratio of the roughened surface portion to the flat surface portion increases with increasing distance from the light source, and a prism sheet is mounted on the light emitting face. In this surface light source device, the uniformity of the brightness distribution of the emitted light can be achieved and the optical loss can be reduced. However, when the surface light source device is used for a display device such as a liquid crystal display device, a marking apparatus or the like, a pattern which is formed of the roughened surface portion and the flat surface portion on the back surface of the light conductor can be observed through the liquid crystal display panel or the display plate, which prevents a viewer from seeing an image.

SUMMARY OF THE INVENTION

Therefore, an object of the present invention is to provide a surface light source device for emitting light which has high brightness and high uniformity in brightness distribution within a light emitting face without performing a uniformity enhancing treatment with a spot pattern or the like.

In view of the foregoing situation, the inventors of the present application have made various earnest studies on the structure of the light emitting face and the back surface of a light conductor, and through these studies they have found out that a surface light source device which can emit light having high brightness and high uniformity of brightness distribution within a light emitting face without performing a uniformity enhancing treatment with a spot pattern or the like can be provided by designing the light emitting face or the back surface thereof to have a roughened surface having a fine uneven shape with a specific average oblique angle, or to have an uneven surface comprising a plurality of lens arrays with a specific average oblique angle.

That is, a surface light source device according to the present invention comprises:

a light source;

a light conductor which has a light incident face on at least one side end surface thereof which confronts the light source, and a light emitting face on one surface thereof which is substantially perpendicular to the light incident face; and a light angle varying sheet which is disposed at a side of the light emitting face of the light conductor, wherein at least one of the light emitting face and a back surface of the light conductor comprises a minute structure having an average slant angle of 0.5 to 7.5 degrees.

A surface light source device according to a first aspect of the present invention comprises: a light source; a light conductor which has a light incident face on at least one side end surface thereof confronting the light source and a light emitting face on one surface thereof which is substantially perpendicular to the light incident face; and a lens sheet which is disposed at the light emitting face side of the light conductor and has a plurality of parallel lens arrays on at least one surface thereof, wherein at least one of the light emitting face and the back surface of the light conductor comprises a roughened surface which includes a plurality of fine convex members each having a substantially spherical surface, and the average oblique angle of the roughened surface is set to 0.5 to 7.5 degrees.

Furthermore, a surface light source device, according to a second aspect of the present invention includes a light source, a light conductor which has a light incident face on at least one side end surface thereof confronting the light source and a light emitting face on one surface thereof which is substantially perpendicular to the light incident face, and a lens sheet which is disposed at the light emitting face side of the light conductor and has many parallel lens arrays on at least one surface thereof, wherein at least one of the light emitting face and the back surface of the light conductor comprises many lens arrays which extend in parallel to the light incident face and each have slant surfaces having an average oblique angle of 0.5 to 7.5 degrees.

Still furthermore, each of a liquid crystal display device, a sign display apparatus and a traffic sign display apparatus according to the present invention uses the surface light source device as a back light.

According to the present invention, many fine convex members which have the substantially spherical surface and the average oblique angle of 0.5 to 7.5 degrees are formed on at least one of the light emitting face and the back surface confronting the light emitting face of the light conductor, or many lens arrays comprising slant surfaces having the average oblique angle of 0.5 to 7.5 degrees are formed in parallel to the light incident face on at least one of the light emitting face and the back surface of the light conductor. With this construction, the light emission efficiency of the light emitted from the light emitting face of the light conductor can be reduced, thereby enabling greater amount of light to propagate toward the tip end portion of the light conductor. Therefore, the high uniformity of the brightness within the light emitting face can be achieved without performing the uniformity treatment using the spot pattern or the like.

BRIEF DESCRIPTION OF THE DRAWINGS

FIG. 10 is a chart showing the surface roughness of a roughened surface of a device of Example 1 according to the present invention, and showing primary and secondary differentials of the surface roughness;

FIG. 11 is a chart showing the surface roughness of a roughened surface of a device of Comparative Example 1 of the present invention, and showing primary and secondary differentials of the surface roughness;

DETAILED DESCRIPTION OF THE INVENTION

Figure 1:
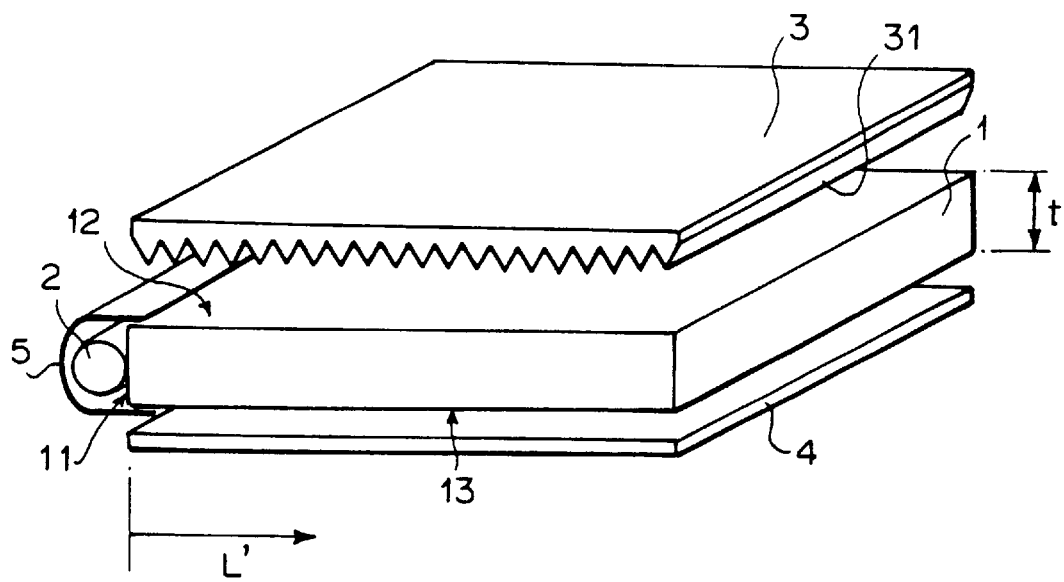
FIG. 1 is a perspective view showing a surface light source device according to the present invention.

FIG. 1 is a perspective view showing a surface light source device of an embodiment according to the present invention. As shown in FIG. 1, the surface light source device of this embodiment includes an elongated light source 2, a light conductor 1 which has at least one light incident face 11 confronting the light source 2 and a light emitting face 12 which is substantially perpendicular to the light incident face 11, and a light angle varying sheet 3 comprising a lens sheet such as prism sheet mounted on the light emitting face 12 of the light conductor 1. In the surface light source device thus constructed, a part of the light which is emitted by the light source 2 and incident onto the light conductor 1, and which has an incident angle distribution over a critical angle, propagates in the light conductor 1 while being totally reflected repetitively from the light emitting face 12 and a back surface 13 of the light conductor 1. When the surface (the light emitting face 12) of the light conductor 1 is designed to be uneven, light which reaches an uneven portion at an angle below the critical angle with respect to the uneven portion is refracted from the uneven portion and emitted to the outside of the light conductor 1. On the other hand, light which reaches an uneven portion at an angle exceeding the critical angle is totally reflected from the uneven portion and continues to propagate in the light conductor 1. This phenomenon happens because the light traveling direction (i.e., whether the light is reflected or refracted) is determined according to Snell's law. In other words, it is determined by the refractive index of a medium and the light incident angle with respect to the normal of the surface to which the light is incident.

Figure 2:
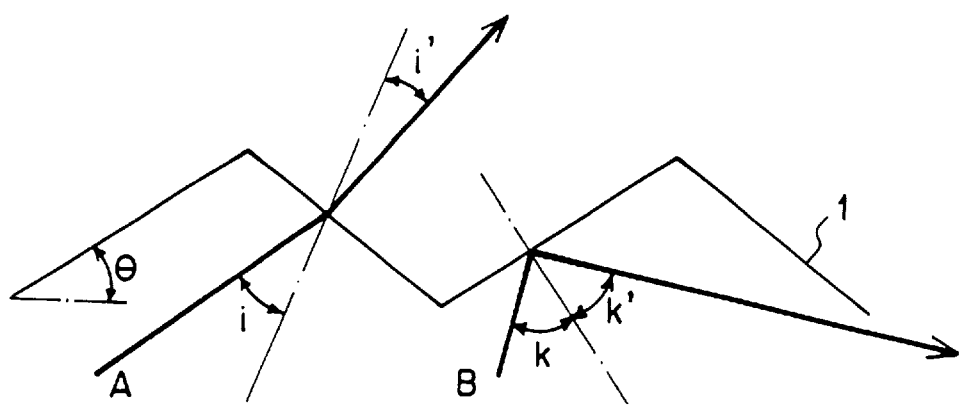
FIG. 2 is a schematic diagram showing an optical path of light on a light emitting face of a light conductor according to the present invention.

FIG. 2 is a schematic diagram showing the light refraction and reflection in the light conductor 1 having an uneven portion on the surface thereof. Light A which is incident onto a slant surface of the uneven portion at an incident angle i, which is below the critical angle, is emitted from the light conductor 1 at an refraction angle i' which satisfies the relationship of nsin(i)=sin(i') (n represents the refractive index of the light conductor 1) according to Snell's law. On the other hand, light B which is incident onto the slant surface at an angle k, which exceeds the critical angle, is totally reflected from the slant surface at an angle k' (k'=k), and continues propagating in the light conductor 1. The light which has been once incident onto the uneven portion and then reflected therefrom is liable to change an incident angle when it is incident again onto the uneven portion, so that there is a probability that the light will be emitted to the outside of the light conductor 1.

The inventors of this application have experimentally found out that the relationship between the light emission intensity (I) at a point and the light emission intensity ($I_0$) at the light incident face end of the surface light source device satisfies the following equation (1):

$$I=I_0(1-\alpha/100)^{L'/t} \tag{1}$$

where α represents the light emission rate, L' represents the distance from the light incident face end and t represents the thickness of the light conductor 1.

It is apparent from equation (1) that if the length (L) and the thickness (t) of the light conductor 1 are determined, the uniformity of the brightness distribution of emitted light within the light emitting face will be dependent on the emission rate (α). The emission rate (α) of the light conductor 1 having a thickness of tmm, can be calculated from the following equation (2):

$$\alpha=(1-10^K)\times 100 \tag{2}$$

K can be calculated by measuring the brightness at 20 mm intervals from the light incident face end of the light conductor 1 and calculating the gradient (K(mm$^{-1}$)) from the logarithmic graph representing the relationship between the ratio (L'/t) of the distance (L') from the light incident face end to the thickness (t) of the light conductor 1 and the brightness thus measured.

In the present invention, a dispersion rate (R%) represented by the following equation (3) is used as a criterion for the uniformity of the brightness distribution to estimate and consider the uniformity of the brightness distribution in the surface light source device. The dispersion rate (R%) is measured as follows. That is, the brightness on the light emitting face of the light conductor 1 is measured on a substantially central area of the light conductor 1, the area extending from a point of 5 mm interval far away from the light incident face end, by 20 mm increments to the end portion confronting the light incident face end of the light conductor 1. The central area is positioned at substantially central portion relative to lengthwise direction of the light source 2. Then, the maximum value (Imax) of the measured brightness, the minimum value (Imin) of the measured brightness, and the average value (Iav) of the measured brightness are calculated. Thereafter, the dispersion rate (R%) is calculated from the following equation (3):

$$R\% = \{(I\max - I\min)/Iav\} \times 100 \quad (3)$$

As a result, it has been found that the emission rate (α) and the dispersion rate (R%) are dependent on the length (L) and the thickness (t) of the light conductor 1, and satisfy the specific relationship therebetween. That is, as the emission rate (α) increases, the dispersion rate (R%) also increases. If the emission rate (α) is constant, the dispersion rate (R%) increases when the ratio (L/t) of the length (L) and the thickness (t) of the light conductor 1 increases. That is, in the light conductor 1 having a fixed size, the uniformity (dispersion rate) of the brightness distribution within the light emitting face of the light conductor 1 is dependent on the emission rate (α) of the light conductor 1, and good uniformity of the brightness distribution can be achieved by controlling the emission rate (α).

In addition, the inventors of the present application have also found that in the case where the surface (light emitting face 12, back surface 13) of the light conductor 1 is designed to have a fine uneven roughened surface comprising many fine convex members having substantially spherical surface, or to have many lens arrays which extend parallel to the light incident face 11 of the light conductor 1, the emission direction and emission rate of the light emitted from the light conductor 1 and the emission rate vary in accordance with the gradient of the uneven portion constituting the roughened surface or the gradient of the slant surfaces constituting the lens arrays.

Particularly in the case of the fine uneven roughened surface, the fine uneven shape of the roughened surface can be approximated by a slant surface having a gradient. Here, the average slant angle (θa) which is defined by ISO 4287/1-1987 may be used as the gradient. As the average slant angle (θa) increases, the light emitted from the light conductor 1 becomes substantially parallel to the direction normal to the light emitting face 12, i.e. the direction of the thickness t of the light conductor 1. Further, as the average slant angle (θa) increases, the emission rate (α) of the light emitted from the light conductor 1 also increases. Therefore, the uniformity of the brightness distribution within the light emitting face 12 of the surface light source device can be enhanced by lowering the emission rate (α) of the light from the light conductor 1, that is, the uniformity can be more enhanced by reducing the average slant angle (θa).

On the basis of the above new knowledge, according to the present invention, at least one of the light emitting face of the light conductor 1 or the back surface of the light conductor 1 which confronts the light emitting face is designed to have a roughened surface or a plurality of lens arrays having an average slant angle (θa) of 0.5 to 7.5 degrees. With this design, the emission rate (α) of the light emitted from the light conductor 1 can be sufficiently reduced, and thus good uniformity of brightness distribution within the light emitting face 12 of the surface light source device can be achieved. If the average slant angle (θa) of the roughened surface is less than 0.5 degrees, the total amount of the light emitted from the light emitting face 12 of the light conductor 1 decreases so that sufficiently high brightness cannot be obtained, or, the light emission angle of the light emitted from the light emitting face (the angle relative to the normal to the light emitting face 12) increases, and thus the emitted light cannot be directed toward the normal direction even by using an angle varying member such as a prism sheet, lens sheet or the like. On the other hand, if the average slant angle (θa) exceeds 7.5 degrees, the light emission rate (α) of the light conductor 1 increases, and thus the uniformity of the brightness distribution of the surface light source device is lowered. Preferably, the average slant angle (θa) is set within a range from 1 to 6 degrees, and more preferably it is set within a range from 2 to 5 degrees.

The average slant angle (θa) on the roughend surface having the fine uneven shape can be calculated as follows. First, the surface roughness of the roughened surface which is formed on the surface of the light conductor 1 is measured at a driving speed of 0.03 mm/second by a probe type (tracing) surface roughness tester, subtracting an average line from the measured chart to correct the slant, and then calculating the average slant angle (θa) from the following equations (4) to (5). Here, L" represents a distance which is scanned by the probe, x represents a measurement position and f(x) represents a displacement of the probe:

$$\Delta a = (1/L") \int_0^{L"} |(d/dx) f(x)| (dx) \quad (4)$$

$$\theta a = \tan^{-1} \Delta a \quad (5)$$

Furthermore, according to the present invention, in order to sufficiently enhance the uniformity of the brightness distribution of the surface light source device, it is preferable to set the emission rate (α) of the light emitted from the light emitting face 12 of the light conductor 1 to 1% to 4.5%. If the light emission rate (α) from the light emitting face of the light conductor is less than 1%, the light emission angle of the light emitted from the light emitting face (the angle relative to the normal of the light emitting face 12) increases, so that it is increasingly difficult to sufficiently direct the emitted light toward the normal direction even by using an angle varying member such as a prism sheet or the like. Conversely, if the emission rate (α) exceeds 4.5%, the uniformity of the brightness distribution of the surface light source device of the liquid crystal display device or the like trends to be lowered. Preferably, the emission rate (α) is set to 1% to 4%, and more preferably it is set to 1.2% to 3.5%.

In order to achieve good uniformity of the brightness distribution in the surface light source device, it is preferable that the following light emission characteristic be obtained. That is, that the light emitted from the light emitting face of the light conductor 1 be directed from the light emitting face so that the peak light (i.e., having the maximum light intensity) is emitted at an angle of 65 degrees or more with respect to the normal direction to the light emitting face, or that the intersecting angle between the direction of the peak light and the direction of the light having half (50%) of the maximum light intensity is equal to 20 degrees or less. If the peak light having the maximum light intensity is emitted at an angle of less than 65 degrees to the normal of the light emitting face, or if the intersecting angle between the direction of the peak light having the maximum light intensity and the direction of the light having the half (50%) maximum intensity exceeds 20 degrees, the emission rate (α) of the light emitted from the light conductor 1 increases, and thus it is increasingly difficult to achieve good uniformity of brightness distribution on the light emitting face.

Still furthermore, in the present invention, a brightness which is as high as possible is needed for the surface light source device, and it is preferable that the light emitted from the surface light source device is concentrated in an observation (viewing) direction. Therefore, it is preferable that the intersecting angle between the direction of the peak light having the maximum intensity from the light conductor 1 and the direction of the light having a light intensity of 10% of the maximum light intensity be below 50 degrees. If the intersecting angle exceeds 50 degrees, the amount of light which is emitted in a direction other than the observation direction increases even by using a light angle varying sheet, so that a sufficiently high brightness cannot be obtained.

In the present invention, when the surface of the light conductor 1 comprises a fine uneven roughened surface comprising a plurality of fine convex members each having a substantially spherical surface, it is preferable to make the radius of curvature of the convex members uniform, and also it is preferable to satisfy a specific relationship among the average period (P), the minute average radius of curvature (R) and the average deviation (S) of the distribution of the minute average radius of curvature of the fine convex members constituting the roughened surface of the light conductor 1. That is, it is preferable that the ratio (R/P) of the minute average radius of curvature (R) and the average period (P) of the convex members be set to 3 to 10, and that the ratio (S/R) of the average deviation (S) of the distribution of the minute average radius of curvature and the minute average radius of curvature (R) be set to 0.85 or less.

If the ratio (R/P) of the minute average radius of curvature (R) of the convex members and the average period (P) of the convex members is less than 3, the average slant angle (θa) of uneven surfaces of the convex members having the substantially spherical surface increases, and thus the emission rate (α) of the light conductor 1 also increases. Therefore, the uniformity of the brightness distribution within the light emitting face of the light conductor 1 tends to be lowered. On the other hand, if the ratio (R/P) is more than 10, the average slant angle (θa) of the uneven surface of the convex members having substantially spherical surface is reduced, and thus the emission rate (α) of the light conductor 1 is excessively reduced. Therefore, the total amount of light emitted from the light emitting face of the light conductor 1 is reduced and thus sufficient brightness cannot be obtained. Preferably, the ratio (R/P) is set to 5 to 7.

Furthermore, if the ratio (S/R) of the average deviation (S) of the distribution of the minute average radius of curvature and the minute average radius of curvature (R) exceeds 0.85, the distribution of the convex members formed on the surface of the light conductor 1 is made disuniform, and the uniformity of the brightness distribution within the light emitting face of the light conductor 1 tends to be lowered. Preferably, the ratio (S/R) is set to 0.8 or less, and more preferably to 0.7 or less.

Figure 3:
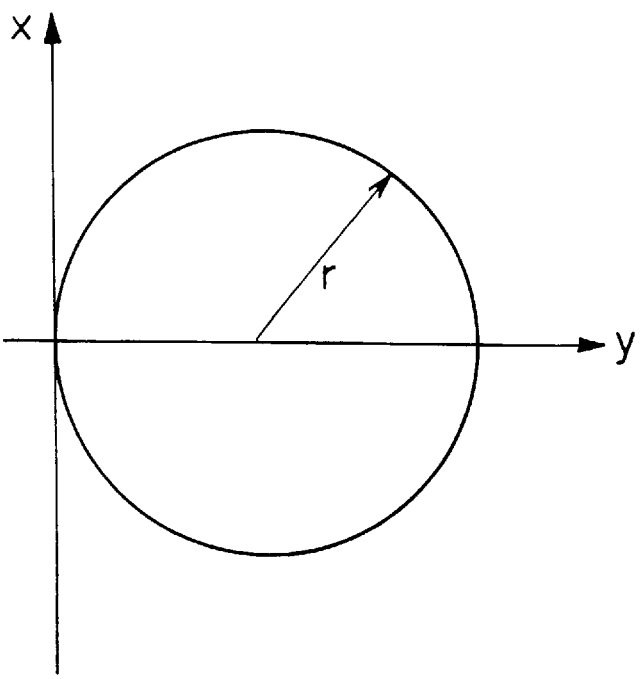
FIG. 3 shows a coordinate system in which the spherical shape of a convex member according to the present invention is simplified as a circle.

In the present invention, the average period (P) of the convex members is defined as follows. That is, a linear area having a fixed distance (for example, 1000 micrometers) in any direction on the roughened surface of the light conductor 1 is measured by a surface roughness tester to measure the number of crests of the convex members, and the average period (P) is obtained as the average value of the period which is calculated on the basis of the measured number of crests (e.g., the average period P is equal to the fixed distance (for example, the 1000 micrometers) divided by the number of crests). Further, the minute average radius of curvature (R) can be calculated from a chart which is obtained by measuring the roughened surface comprising the convex members with a surface roughness tester as follows. First, for simplicity, the spherical shape of the convex members is simplified as or assumed to be a circular arc. As shown in the coordinate system of FIG. 3, a circle is represented by the following equation (6) where r represents the radius of the circle:

$$y^2 - 2ry + x^2 = 0 \tag{6}$$

By solving equation (6) for y, the following equation (7) is obtained on the assumption that the projecting portion of each of the convex members is directed in a negative direction of y:

$$y = x^2/\{r + (r^2 - x^2)^{1/2}\} \tag{7}$$

As commonly used in the optical lens design field, when the center portion of the spherical surface of the convex member is used, r>x, and the following equation (8) is obtained as an approximate version of equation (7):

$$y = x^2/2r \tag{8}$$

Further, the spherical surface (circular arc) can be substituted by a quadratic curve as follows:

$$d^2y/dx^2 = 1/r \tag{9}$$

Therefore, it is found that the secondary differential coefficient is equal to the reciprocal of the radius. Accordingly, the minute average radius of curvature (R) can be calculated by calculating the secondary differential coefficient from the chart curve measured by the surface roughness tester, and then by calculating the average value of the reciprocal of the secondary differential coefficient.

Further, if an area is divided into n equal sub-areas, and if the radius of curvature of each sub-area is represented by $r_i$, then the minute average radius of curvature (R) can be found by the following equation (10):

$$R = \frac{\sum_{i=1}^{n} r_i}{n} \tag{10}$$

The average deviation (S) of the minute average radius of curvature (R) shows a deviation from the average value, and thus it is represented by the following equation (11):

$$S = \frac{\sum_{i=1}^{n} |r_i - R|}{n} \tag{11}$$

In the present invention, the minute average radius of curvature (R) and the average deviation (S) are measured when the size of the minute sub-area is set below 5 micrometers. The ratio (S/R) of the average deviation (S) of the distribution of the minute average radius of curvature and the minute average radius of curvature (R) is represented by the following equation (12):

$$S/R = \frac{\sum_{i=1}^{n} |r_i - R|}{nR} \tag{12}$$

In order to enhance the brightness of the surface light source device, it is preferable to concentrate the light emitted from the surface light source device in the observation (viewing) direction, and thus it is preferable to concentratedly emit the light in one direction from the light conductor 1. According to the present invention, in order to concentratedly emit the light in one direction from the light conductor 1, the roughened surface constituting at least one of the light emitting face of the light conductor and the back surface thereof is preferably designed so that an area having a minute average slant angle (Δθa) of 20 degrees or more is located with an occupation rate (or density) of 2% or less on the roughened surface. If the occupation rate (or density) of such an area exceeds 2%, the degree of concentration of the light emitted from the light conductor 1 is lowered, and the rate of the light which is emitted in a direction other than the observation (viewing) direction is increased even by using a light angle varying member such as a prism sheet or the like therewith in combination, with the result that the brightness of the surface light source device cannot be sufficiently enhanced. Preferably, the occupation rate (or density) of the area having the minute average slant angle ($\Delta\theta a$) of 20 degrees or more is set to 1% or less.

Particularly when the emission rate ($\alpha$) of the light emitted from the light conductor 1 is lowered, the rate of light which propagates or goes and returns in the light conductor 1 while being reflected is increased, so that the amount of the light emitted from the light conductor 1 itself is reduced. Therefore, it is preferable to enhance the light brightness of the surface light source device by concentrating the light emission direction of the emitted light to one direction. The occupation rate of the area having the minute average slant angle ($\Delta\theta a$) of 20 degrees or more is calculated as follows. That is, the surface roughness of the roughened surface of the light conductor 1 is measured at a driving speed of 0.03 mm/second by the probe type surface roughness tester to obtain a surface roughness chart. The chart thus obtained is divided into minute areas of n portions (n=L/xo) at a fixed minute interval (xo) to calculate the minute average slant angle ($\Delta\theta a$) for each minute area (the interval xo is taken as the interval between the measurement points xa and xb) according to the following equation (13), and then a rate of the number of the minute areas having the minute average slant angle ($\Delta\theta a$) of 20 degrees or more with respect to the total number of minute areas is found:

$$\Delta\theta a = \tan^{-1}((f(xa)-f(xb))/xo) \quad (13)$$

Further, when the surface of the light conductor 1 is roughened by forming the fine uneven portions, the haze value thereof is preferably set to 20% to 40%. The reason is as follows. The surface light source device can provide a brightness having high uniformity and a small dispersion rate (R%) by reducing the emission rate ($\alpha$) of the light emitted from the light emitting face of the light conductor 1. However, when the emission rate ($\alpha$) is relatively small as described above, the rate of light which goes and returns while being reflected in the light conductor 1 is increased, and the amount of the light emitted from the light conductor 1 is reduced. Therefore, it is preferable to enhance the brightness of the surface light source device. Therefore, a surface roughening treatment is performed so that the haze value of the light conductor 1 is set to 20% to 40%, whereby the brightness of the surface light source device can be enhanced. If the haze value of the light conductor 1 is less than 20%, the unevenness of the roughened surface is reduced, and the brightness of the surface light source device cannot be sufficiently enhanced. On the other hand, if the haze value exceeds 40%, the unevenness of the roughened surface is disadvantageous, and spots are liable to occur in the emitted light or the uniformity of the brightness distribution tends to be reduced. Preferably, the haze value is set to from 30% to 40%.

The processing method of uniformly forming a plurality of fine convex members having substantially spherical surface on the light conductor 1 is not limited to any specific one. For example, there may be used a method of transferring a roughened surface by a heat-press method, an injection molding method or the like by using a mold or die made of metal or glass on which a roughened surface is formed by a chemical etching method using hydrofluoric acid or the like, a mold or die which is roughened by blasting with fine particles such as glass beads or the like, or a mold or die on which a roughed surface is formed by using the blasting and chemically etching methods in combination, a method of unevenly coating or sticking transparent materials onto the light conductor 1 by a printing method or the like, a method of directly processing the light conductor 1 by a blasting method or an etching method, or the like. Of these methods, the following method is preferable. That is, fine particles such as glass beads or the like are blown onto the surface of a glass plate to perform a blasting treatment on the glass plate, and then the blast-treated surface of the glass plate is subjected to chemical etching with hydrofluoric acid or the like to form a roughened surface on the glass plate (i.e., a mold or die having the roughened surface). By using the mold or die thus formed, the roughened surface is transferred onto a transparent plate by the heat-press method or the like, or transparent resin is injected into the mold, whereby the light conductor 1 having the roughened surface is formed.

Figure 4:
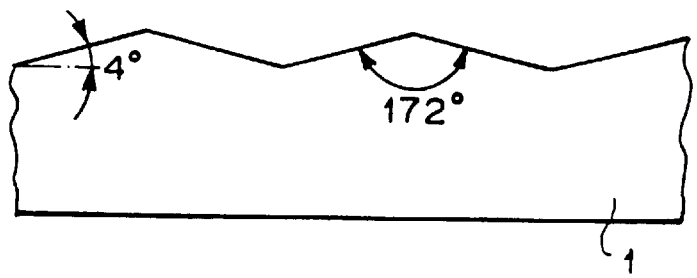
FIG. 4 is a partial cross-sectional view showing a prism surface of the light conductor according to the present invention.
Figure 5:
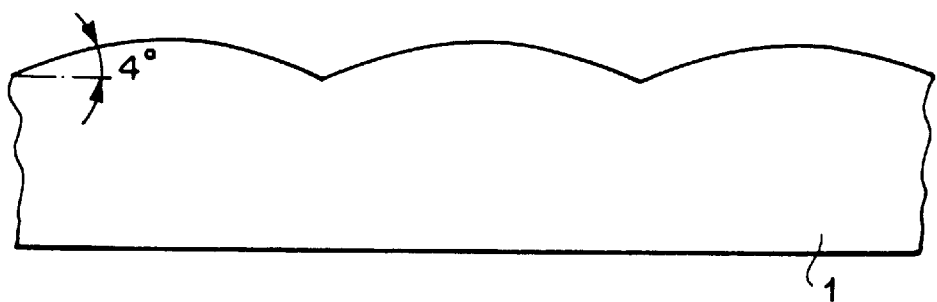
FIG. 5 is a partial cross-sectional view showing a lenticular lens surface of the light conductor according to the present invention.

The plural lens arrays to be formed on the surface of the light conductor 1 are not limited to specific ones insofar as the lens arrays are designed to have slant surfaces having an average slant angle ($\theta a$) of 0.5 to 7.5 degrees as shown in FIGS. 4 and 5. For example, a lenticular lens array having an arcuate shape in section, a prism array having a sawtoothed shape in section, an uneven array having a continuous wavelike shape in section or the like are all possible. Of these arrays, the prism array (FIG. 4) and the lenticular lens array (FIG. 5) which are symmetrical on the right and left sides in section are particularly preferable. Such lens arrays are formed so as to extend in parallel to the light incident face 11 of the light conductor 1, and more preferably the lens arrays are formed so as to be continuous to and parallel to one another. The pitch of the lens arrays is suitably selected in accordance with the application thereof, and normally it is preferably set to 20 micrometers to 5 mm.

As the processing method of forming the plural lens arrays comprising the slant surfaces having a specific average slant angle ($\theta a$) on the surface of the light conductor 1, there may be used a method of performing a heat-press on a transparent substrate or performing the injection molding of transparent resin by using a mold or die made of metal or glass on which a lens pattern is formed by a chemical etching method, a tool cutting method, a laser processing method or the like, a method of coating a transparent substrate with resin which can be cured by activation energy irradiation, and then curing the resin by applying the activation energy irradiation thereby transferring a lens pattern, a method of directly processing the light conductor 1 by an etching method, a tool cutting method, a laser processing method or the like.

The size of the light conductor 1 of the surface light source device according to the present invention is not limited to specific one. However, in order to enhance the advantageous effect of the present invention even more, the ratio (L/t) of the length (L) and the thickness (t) of the light conductor 1 is preferably set to 200 or less. If L/t exceeds 200, the uniformity of the brightness distribution within the light emitting face is not sufficiently achieved even by reducing the average slant angle ($\theta a$) of the roughened surface or of the lens arrays of the light conductor 1. Preferably, L/t is set to 150 or less. Particularly when the surface light source device is used for a liquid crystal display device, L/t is preferably set to 100 or less, and more preferably set to 80 or less.

In the present invention, a transparent planar member of glass or synthetic resin may be used as the light conductor 1. As synthetic resin, there may be used various kinds of highly transparent synthetic resins such as acrylic resin, polycarbonate resin, vinyl chloride resin, etc. These resins may be molded into a planar member by a normal molding method such as the extrusion molding method, an injection molding method or the like to form a light conductor. Particularly, methacrylate resin is excellent in light transmission, heat resistance, dynamic characteristics and molding and processing performance, etc., and thus it is more suitable as the material for the light conductor. Particularly, resin containing methyl methacrylate units of 80% by weight or more is preferable as the methacrylate resin. Further, inorganic fine particles such as glass beads, titanium oxide or the like, or fine particles made of styrene resin, acrylic resin, silicone resin or the like may be dispersed as light-diffusing material in the light conductor 1.

Figure 6:
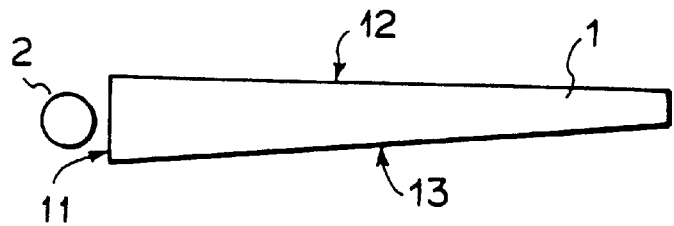
FIG. 6 is a side view showing a light conductor of the surface light source device according to present invention.
Figure 7:
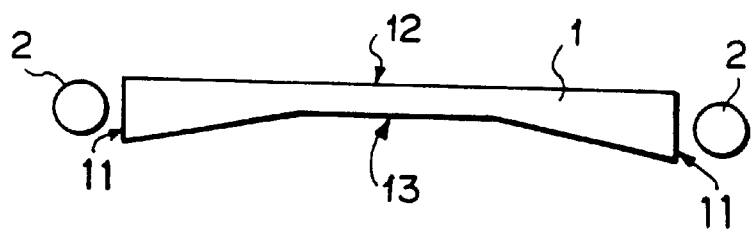
FIG. 7 is a side view showing another light conductor of the surface light source device according to present invention.

In the surface light source device of the present invention, the light source 2 such as a fluorescent lamp or the like is disposed adjacent to one end portion (light incident face 11) of the light conductor 1 described above, and a reflection layer 4 of a reflection film or the like is formed on the back surface 13 of the light conductor 1 confronting the light emitting face 12. In order to effectively guide the light from the light source 2 to the light conductor 1, the light source 2 and the light incident face 11 of the light conductor 1 are covered by a case or a film 5 which is coated with a reflection agent on the inside thereof. Further, various shapes such as a planar shape, a wedge shape as shown in FIG. 6 (the thickness t gradually decreases along L' direction), a shape as shown in FIG. 7 (the thickness t gradually decreases at both end portions along L' direction toward the central portion), etc., may be adopted for the light conductor 1.

In the surface light source device according to the present invention, the light is normally emitted from the light conductor 1 with such a directivity that the emission direction thereof is at an angle of 60 to 80 degrees to the normal of the light emitting face 12. Therefore, in order to vary the emission direction of the light to a specific direction such as in the normal direction or the like, a light deflecting sheet or light angle varying sheet 3 is mounted on the light conductor 1. In this case, a diffusion sheet, a lens sheet having a lens face on which a plurality of lens units are formed in parallel on at least one surface thereof or the like may be used as the light angle varying sheet 3. The shape of the lenses formed on the lens sheet varies in accordance with the particular application purpose. For example, a prism shape, a lenticular lens shape, a wavelike shape or the like may be used. The pitch of the lens units of the lens sheet is preferably set to about 30 micrometers to 0.5 mm. When a prism sheet is used, the apex angle of the prism is suitably determined on the basis of the predetermined emission angle of the light emitted from the light conductor 1, and generally it is preferably set to 50 to 120 degrees. Further, the direction of the lens sheet is suitably determined on the basis of the predetermined emission angle of the light emitted from the light conductor 1. The prism sheet may be mounted so that the lens face is disposed at the light conductor side or the opposite side.

In the light conductor 1 which has a roughened surface or surface comprising the plural lens arrays having the specific average slant angle ($\theta$a), the prism sheet having the apex angle of 50 to 75 degrees is usually mounted so that the prism face is disposed at the light conductor side, whereby the light emitted from the light emitting face can be directed substantially in the normal direction with respect to the light emitting face 12.

In the surface light source device according to the present invention, a plurality of light angle varying sheets 3 are usable when overlaid upon each other. For example, when two lens sheets are used, these lens sheets may be stacked so that the lens arrays of these lens sheets intersect at an angle or are parallel to one another. Each of the lens sheets may be disposed with the lens face thereof laid face up or down. Further, the lens sheets may be disposed so that the lens faces thereof are disposed at opposite sides. In this case, it is preferable that the first lens sheet adjacent to the light conductor 1 be disposed so that the lens face thereof is located at the light conductor side and the lens arrays 31 are disposed parallel to the light source (see FIG. 1) while the second lens sheet is disposed so that the lens face thereof is located at the opposite side to the light conductor and the lens arrays thereof are perpendicular to the lens arrays of the first lens sheet. When the prism sheet is used as the lens sheet, it is further preferable that the apex angle of the first prism sheet be set to 50 to 75 degrees, and the apex angle of the second prism sheet be set to 80 to 100 degrees.

Furthermore, according to the surface light source device of the present invention, the lens sheet is preferably formed of material having a high transmission to visible radiation and a relatively high refractive index. For example, acrylic resin, polycarbonate resin, vinyl chloride resin, activation energy curable resin or the like may be used. Of these materials, the activation energy curable resin is preferably used from the viewpoint of abrasion resistance, ease of handling, productivity, etc. Additive agents may be added to the lens sheet, such as antioxidants, ultraviolet ray absorbent, yellowing preventing agent, blueing agent, pigment, dispersing agent or the like. An extrusion molding method, an injection molding method or any other normal molding method may be used to manufacture the lens sheet. When the lens sheet 3 is manufactured by using activation energy curable resin, a lens portion made of the activation energy curable resin is formed on a transparent substrate such as a transparent film or sheet which is formed of transparent resin such as polyester resin, acrylic resin, polycarbonate resin, vinyl chloride resin, polymethacryl imide resin, polyolefine resin or the like. First, activation energy curable resin liquid is injected into a lens mold on which a predetermined lens pattern is formed, and then it is overlaid on the transparent substrate. Subsequently, activation energy such as ultraviolet rays, electron beams or the like are irradiated through the transparent substrate to the activation energy curable resin liquid to polymerize and cure the resin liquid, and the cured resin is exfoliated from the lens mold to form a lens sheet.

According to the surface light source device of the present invention, together with the lens sheet as described above, there may be used a diffusion sheet, a color filter, a polarizing membrane, or various optical elements which can optically deflect, converge or diffuse the light or vary the optical characteristics thereof. Further, a general linear pipe type fluorescent lamp may be used as the light source 2. When it is difficult to exchange or replace the light source 2, a light line comprising plural optical fibers may be used to guide light from another light source which is separately disposed.

Figure 8:
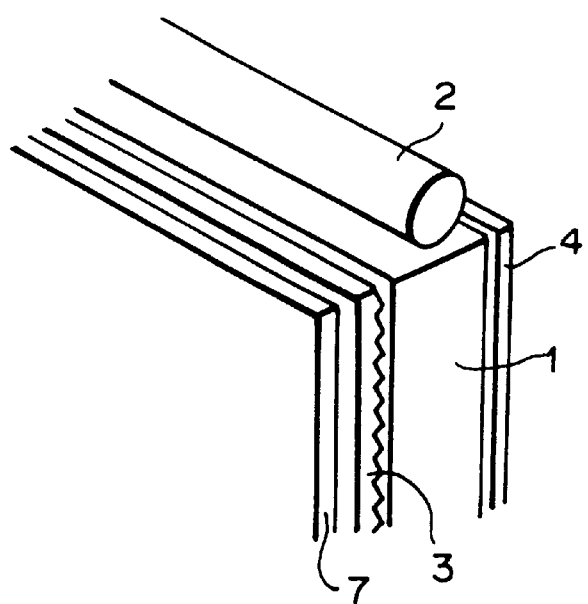
FIG. 8 is a partial perspective view showing a liquid crystal display device according to present invention.

If a liquid crystal display element 7 is mounted at the light emitting face side of the surface light source device thus constructed as shown in FIG. 8, it can be used as a liquid crystal display device for a portable personal computer, a liquid crystal television or the like. In such a liquid crystal display device, very high uniformity is required for the brightness distribution, and it is required to reduce the dispersion rate (R%) to 30% or less, preferably to 25% or less, and more preferably to 20% or less.

Further, instead of mounting the liquid crystal display element 7, by mounting a signboard on which characters, figures, photographs or the like are formed on a semi-transparent plastic plate comprised of methacryl plate or the like by cutting, printing or the like, it may be used as a sign display apparatus such as a guide signboard, a large-scale signboard or the like in a station, public facilities or the like. In such a sign display apparatus, it is required to reduce the dispersion rate (R%) to 250% or less, preferably to 200% or less.

Further, instead of mounting the liquid crystal display element 7, by mounting a signboard on which a traffic guide, a traffic sign or the like is formed on a plastic plate comprising a methacryl plate or the like by cutting, printing or the like, it may be used as a traffic sign display apparatus for various guide signs, traffic signs, etc., in a highway road or a general road. In such a traffic sign display apparatus, it is required to reduce the dispersion rate (R%) to 450% or less, preferably to 300% or less.

Next, the present invention will be described in more detail with the following Examples and Comparative Examples, wherein each physical property and characteristic were measured as follows.

Emission Rate ($\alpha$)

The brightness was measured at every interval of 20 mm increments from the light incident face end of the light conductor, and the gradient ($K(mm^{-1})$) of the logarithmic graph which shows the relationship between the ratio ($L'/t$) of the distance ($L'$) from the light incident face end to the thickness ($t$) of the light conductor 1 and the brightness was calculated to calculate the emission rate ($\alpha$) from equation (2).

Dispersion Rate (R%)

The light brightness on the light emitting face of the light conductor 1 was measured on a substantially central area of the light conductor 1, the area extending from a point of 5 mm interval far away from the light incident face end by 20 mm increments to the end portion confronting the light incident face end of the light conductor 1. The central area is positioned at substantially central portion relative to a direction parallel to the light incident face. The maximum value (Imax) of the measured brightness, the minimum value (Imin) of the measured brightness, and the average value (Iav) of the measured brightness were calculated. Thereafter, the dispersion rate (R%) was calculated from equation (3).

Average Slant Angle ($\theta a$)

The average slant angle was measured according to ISO4287/1-1987. The surface roughness of the roughened surface was measured at a driving speed of 0.03 mm/second by a probe type surface roughness tester (SURFCOM 570A produced by Tokyo Seiki Co., Ltd.) using an E-DT-SO4A (1 micrometer R, 55° circular cone, diamond) as a probe. A chart was obtained, and a slant correction was performed by subtracting the average line. The average slant angle was calculated from equations (4) and (5).

Measurement of Angular Distribution of Light Emitted from Light Conductor

A cold cathode tube was connected to a DC power source through an inverter (CXA-M10L produced by TDK), and a potential of DC 12V was applied to the cathode tube to turn on the cathode tube. The light conductor was mounted on a measuring table so as to be rotatable at the center portion thereof around the rotational shaft parallel to the axis of the cathode tube. Subsequently, a black sheet having a pinhole of 3 mm in diameter was fixed onto the light conductor so that the pinhole was disposed at the center of the light conductor, and a luminance meter (nt–1° produced by Minolta) was suitably disposed while adjusting the distance between the luminance meter and the light conductor so that the measurement circle was set to 8 to 9 mm in diameter. After waiting for aging of the cold cathode tube over a 30 minute period, the rotational shaft was rotated from +85 degrees to –85 degrees every 1 degree to measure the brightness of the emitted light by the luminance meter.

Figure 9:
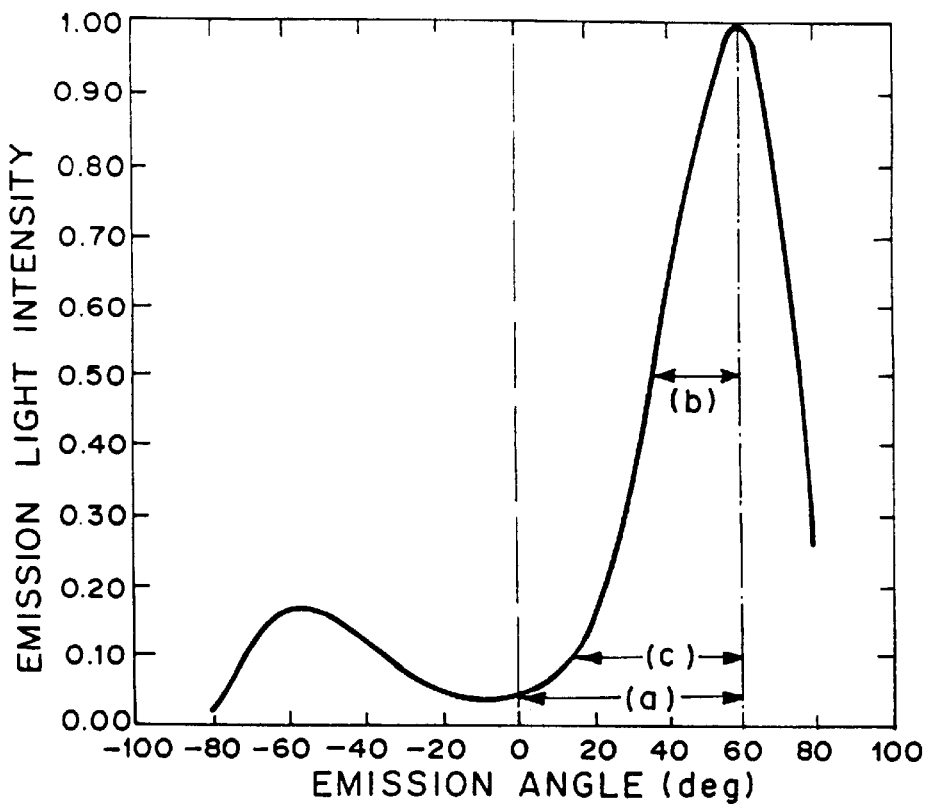
FIG. 9 is a graph showing a distribution of light emitted from the light conductor.

On the basis of the measurement results, the angle (a) of the direction of the peak light having a maximum light intensity with respect to the normal, the intersection angle (b) between the direction of the peak light having the maximum light intensity and the direction of the light having half (50%) of the maximum light intensity, and the intersection angle (c) between the direction of the peak light having the maximum light intensity and the direction of the light having 10% of the maximum light intensity were measured as shown in FIG. 9.

Measurement of Brightness in Normal Direction (Normal Brightness) of Surface Light Source Device (Compact-size Surface Light Source Device)

A cold cathode tube was connected to a DC power source through an inverter (CXA-M10L produced by TDK), and a potential of DC 12V was applied to the cathode tube to turn on the cathode tube. The surface light source device was mounted on a measuring table so as to be rotatable at the center portion thereof around the rotational shaft parallel to the axis of the cathode tube. Subsequently, a black sheet having a pinhole of 3 mm in diameter was fixed onto the light conductor so that the pinhole was disposed at the center of the light conductor, and a luminance meter (nt–1° produced by Minolta) was suitably disposed while adjusting the distance between the luminance meter and the surface light source device so that the measurement circle was set to 8 to 9 mm in diameter. After waiting for aging of the cold cathode tube over a 30 minute period, the rotational shaft was set to 0 degrees, and the brightness of the emitted light was measured by the luminance meter. The measurement was conducted on the surface light source device, except for an area within 5 mm from the edge of the light conductor confronting the cold cathode tube. The area to be measured was sectioned into square sub-areas of 20 mm×20 mm in area, and the brightness was measured at the center of each square sub-area. Thereafter, the respective measurement values were averaged to obtain the normal brightness.

Measurement of Normal Brightness of Surface Light Source Device (Large-size Surface Light Source Device)

Except that a fluorescent lamp of 30 W was used as the light source, the same measurement method as for the compact-size surface light source device was used.

Occupation Rate of Area having a Minute Average Slant Angle ($\Delta\theta a$) Above 20 Degrees The surface roughness of the roughened surface was measured in the same manner as the average slant angle ($\theta a$). The chart thus obtained was divided into n minute areas at 1 mm intervals, and the minute average slant angle ($\Delta\theta a$) in each minute area was calculated from equation (13). On the basis of this calculation result, the occupation rate (or density) of the minute areas in which the minute average slant angle ($\Delta\theta a$) was above 20 degrees was found as the ratio of the number of the minute areas of $\Delta\theta a$ of above 20 degrees to the total number of the minutes areas.

Measurement of Surface Roughness

The measurement of the surface roughness was performed at a driving speed of 0.03 mm/second by a probe type surface roughness tester (SURFCOM 570A produced by Tokyo Seiki Co., Ltd.) using a 1-micrometer R, 55° circular cone diamond needle (010-2528) as a probe. The measurement values (surface roughness) were recorded at an interval of 5 micrometers. Furthermore, the primary differential coefficient (Ki) and the secondary differential coefficient (Li) were calculated on the basis of the measurement values (Di) according to equations (14) and (15):

$$Ki=(D_{i+1}-Di)/5 \quad (14)$$

$$Li=(K_{i+1}-Ki)/5 \quad (15)$$

Average Period (S)

The primary differential coefficient (Ki) on a linear area of 1000 micrometers in any direction of the light conductor was measured at an interval of 5 micrometers. The primary differential coefficients (Ki) thus obtained were successively linked to one another, and from the following equation (16), the average period (S) was calculated on the basis of the frequency m at which the link thus obtained traversed the "0" level.

$$S=(1000\times2)/m \quad (16)$$

Minute Average Radius of Curvature (R)

The absolute value of the reciprocal of the secondary differential coefficient (Li) which was obtained by the probe type surface roughness tester was calculated, and values thus obtained, except for values which are less than $10^{-6}$, were averaged. The average value thus calculated was set as the minute average radius of curvature (R).

Average Deviation (S) of Distribution of Minute Average Radius of Curvature

From equation (11), the average deviation (S) was calculated from the radius of curvature (ri) and the minute average radius of curvature (R) which were obtained at an interval of 5 micrometers on the linear area of 1000 micrometers in any direction of the light conductor 1.

EXAMPLE 1

The surface of a glass plate was subjected to a blast treatment using glass beads of 125 to 149 micrometers in particle size (FGB-120 produced by Fuji Manufacturing Works Co., Ltd.) under the condition that the distance between the glass plate and a blast nozzle was set to 10 cm and the blast pressure was set to 4 Kg/cm². Thereafter, a hydrofluoric acid treatment was conducted to chemically etch the blast surface of the glass plate, and a replica mold or die was obtained by conducting an electroforming method on the glass plate. By performing a heat-press using the mold, the roughened surface thereof was transferred onto one surface of a transparent acrylic resin plate of 4 mm in thickness and 165 mm×210mm in area to form a light conductor.

The roughened surface of the light conductor thus constructed had a structure such that fine convex members having substantially spherical surface were uniformly distributed. The average slant angle (θa) and the occupation rate of the areas having the minute average slant angle (Δθa) of 20 degrees or more of the roughened surface were measured. The results are shown in Table 1. The roughened surface of the light conductor thus obtained was measured by the probe type surface roughness tester to obtain the roughened surface chart shown in FIG. 10. The primary differential coefficient and the secondary differential coefficient were calculated from the chart, and the calculation result is also shown in FIG. 10. Table 1 shows the structure parameters for the light conductor surface. Further, the angular distribution of the light emitted from the light conductor was measured to obtain the angle (peak angle) of the peak light having a maximum light intensity to the normal, the intersecting angle (peak 50% angle) between the direction of the peak light having the maximum light intensity and the direction of the light having 50% of the maximum light intensity, and the intersecting angle (peak 10% angle) between the direction of the light having the maximum light intensity and the direction of the light having 10% of the maximum light intensity. The results are shown in Table 1.

A PET film on which silver was deposited was adhesively attached to each of one end surface of 210 mm and two end surfaces of 165 mm of the light conductor thus obtained, and further a PET film on which silver was deposited was fixed to the back surface confronting the light emitting face by an adhesive tape to form reflection surface. A linear pipe type fluorescent lamp (KC230T4E (4 mm in diameter×230 mm in length) produced by Matsushita Electric Co., Ltd.) was disposed at the remaining end surface of 210 mm of the light conductor. Subsequently, a prism sheet including a plurality of parallel prism arrays each having an apex angle of 63 degrees and a pitch of 50 micrometers (which was formed by ultraviolet ray curable acrylic resin having a refractive index of 1.53 on the PET film) was disposed on the light emitting face of the light conductor so that the prism face confronted the light emitting face side of the light conductor, thereby fabricating a surface light source device. The normal brightness of the surface light source device thus fabricated was measured, and the measurement results are shown in Table 1.

A light conductor was formed with a transparent acrylic resin plate of 3 mm in thickness and 90 mm×300 mm in area in the same manner as described above. A PET film on which silver was deposited was adhesively attached to each of the two 300 mm end surfaces of the light conductor thus obtained, and a PET film on which silver was deposited was fixed to the back surface confronting the light emitting face by an adhesive tape to form reflection surface. A linear pipe type fluorescent lamp (KC130T4E—4 mm in diameter×130 mm in length—produced by Matsushita Electric Co., Ltd.) was disposed at one end surface of 90 mm of the light conductor. The emission rate and the dispersion rate (R%) of the light conductor thus obtained were measured, and the results are shown in Table 1.

EXAMPLE 2

The surface of a mirror-polished stainless steel plate was subjected to the blast treatment using glass beads of 125 to 149 micrometers in particle size (FGB-120 produced by Fuji Manufacturing Works Co., Ltd.) under the condition that the distance between the stainless steel plate and a blast nozzle was set to 10 cm and the blast pressure was set to 4 Kg/cm². By performing a heat-press using this stainless steel plate mold or die, the roughened surface was transferred onto one surface of a transparent acrylic resin plate of 3 mm in thickness and 165 mm×210 mm in area to form a light conductor.

The roughened surface of the light conductor thus constructed had a structure such that the fine convex members having substantially spherical surface were uniformly distributed. The average slant angle (θa) and the occupation rate of the areas having the minute average slant angle (Δθa) of 20 degrees or more of the roughened surface were measured. The results are shown in Table 1. The roughened surface of the light conductor thus obtained was measured by the probe type surface roughness tester, and the structure parameters of the surface of the light conductor are shown in Table 1. Further, the angular distribution of the light emitted from the light conductor was measured to obtain the angle (peak angle) of the peak light having a maximum light intensity to the normal, the intersecting angle (peak 50% angle) between the direction of the peak light having the maximum light intensity and the direction of the light having 50% of the maximum light intensity, and the intersecting angle (peak 10% angle) between the direction of the light having the maximum light intensity and the direction of the light having 10% of the maximum light intensity. The results are shown in Table 1.

A surface light source device was fabricated with the light conductor thus obtained in the same manner as in Example 1. The normal brightness of the surface light source device thus obtained was measured, and the measurement results are shown in Table 1. Further, by using the surface light source device which was constructed with the above light conductor in the same manner as Example 1, the emission rate and the dispersion rate (R%) of the light conductor were measured, and the results are shown in Table 1.

EXAMPLE 3

By using the stainless steel plate mold used in Example 2, the roughened surface was transferred onto one surface of a transparent acrylic resin plate of 4 mm in thickness and 165 mm×210 mm in area by a thermal transfer method to obtain a light conductor. The light conductor thus obtained had the same structure, physical properties and characteristics as that of Example 2. A surface light source device was fabricated with the light conductor thus obtained in the same manner as the Example 1. The normal brightness of the surface light source device thus obtained was measured, and the measurement results are shown in Table 1. By using the surface light source device which was constructed with the above light conductor in the same manner as Example 1, the emission rate and the dispersion rate (R%) of the light conductor were measured, and the results are shown in Table 1.

EXAMPLE 4

A light conductor was obtained in the same manner as in Example 1, except that a wedge-shaped plate having a thickness of 3 mm at one 210 mm end and a thickness of 1 mm at another 210 mm end was used as the transparent acrylic resin plate. The light conductor thus obtained has the same structure, physical properties and characteristics as Example 1. Further, a surface light source device was fabricated with the light conductor thus obtained in the same manner as Example 1 except that the linear pipe type fluorescent lamp was disposed at the end surface side having the thickness of 3 mm of the light conductor. The the normal brightness of the surface light source device thus fabricated and the emission rate ($\alpha$) and dispersion rate (R%) of the light conductor thereof were measured, and the results are shown in Table 1.

Comparative Example 1

A light conductor was obtained in the same manner as Example 2 except that glass beads of 74 to 88 micrometers in particle size (FGB-200 produced by Fuji Manufacturing Works, Co., Ltd.) were used for the blast treatment. The average slant angle ($\theta a$) and the occupation rate of areas having the minute average slant angle ($\Delta\theta a$) of 20 degrees or more of the light conductor thus obtained were measured, and the results are shown in Table 1. The roughened surface of the light conductor thus obtained was measured by the probe type surface roughness tester to obtain the roughened surface chart shown in FIG. 11. The primary differential coefficient and the secondary differential coefficient were calculated from the chart, and the calculation result is also shown in FIG. 11. Table 1 shows the structure parameters of the light conductor surface. Further, the angular distribution of the light emitted from the light conductor was measured to obtain the angle (peak angle) of the peak light having a maximum light intensity with respect to the normal, the intersecting angle (peak 50% angle) between the direction of the peak light having the maximum light intensity and the direction of the light having 50% of the maximum light intensity, and the intersecting angle (peak 10% angle) between the direction of the light having the maximum light intensity and the direction of the light having 10% of the maximum light intensity. The results are shown in Table 1.

Like Example 1, a surface light source device was fabricated with the light conductor thus obtained. The normal brightness of the surface light source device thus obtained was measured, and the results are shown in Table 1. Further, by using the surface light source device which was constructed with the above light conductor in the manner as Example 1, the emission rate and the dispersion rate (R%) of the light conductor were measured, and the measurement results are shown in Table 1.

Comparative Example 2

By using the stainless steel plate mold used in Comparative Example 1, the roughened surface was transferred onto one surface of a transparent acrylic resin plate of 4 mm in thickness and 165 mm×210 mm in area by the thermal transfer method so as to form a light conductor. The light conductor thus obtained had the same structure, physical properties and characteristics as Example 2. A surface light source device was fabricated with the light conductor in the same manner as Example 1. The normal brightness of the surface light source device thus obtained was measured, and the measurement results are shown in Table 1. Further, by using the surface light source device which was constructed with the above light conductor in the same manner as Example 1, the emission rate and the dispersion rate (R%) of the light conductor were measured, and the results are shown in Table 1.

Comparative Example 3

A light conductor was obtained in the same manner as Example 2 except that glass beads of 53 to 62 micrometers in particle size (FGB-300 produced by Fuji Manufacturing Works, Co., Ltd.) were used for the blast treatment and the blast pressure was set to 5 Kg/cm². The average slant angle ($\theta a$) and the occupation rate of areas having a minute average slant angle ($\Delta\theta a$) of 20 degrees or more of the light conductor thus obtained were measured, and the results are shown in Table 1. Further, the roughened surface of the light conductor thus obtained was measured by the probe type surface roughness tester, and the structure parameters of the light conductor surface were as shown in Table 1. Further, the angular distribution of the light emitted from the light conductor was measured to obtain the angle (peak angle) of the peak light having the maximum light intensity to the normal, the intersecting angle (peak 50% angle) between the direction of the peak light having the maximum light intensity and the direction of the light having 50% of the maximum light intensity, and the intersecting angle (peak 10% angle) between the direction of the light having the maximum light intensity and the direction of the light having 10% of the maximum light intensity. The results are shown in Table 1.

The normal brightness of the surface light source device thus obtained was measured, and the measurement results are shown in Table 1. Further, by using the surface light source device which was constructed with the above light conductor in the same manner as Example 1, the emission rate and the dispersion rate (R%) of the light conductor were measured, and the results are shown in Table 1.

EXAMPLE 5

A prism pattern comprising a plurality of prism arrays of 172 degrees in apex angle and 50 micrometers in pitch which were formed continuously in parallel to one another corresponding to the shape shown in FIG. 4, was formed on a brass plate by using a diamond cutter to form a die or mold. By using the die thus obtained, a prism face was transferred onto one surface of a transparent acrylic resin plate of 4 mm×210 mm×165 mm in size by the thermal transfer method to form a light conductor. The average slant angle ($\theta$a) of the light conductor thus obtained was equal to 4.2 degrees. A silver-deposited PET film was adhesively attached to each of the two 165 mm end surfaces of the light conductor and one of the other two end surfaces of the light conductor, and a silver-deposited PET film was fixed to the back surface confronting the light emitting face having the prism face by an adhesive tape to form reflection surface. Further, a cold cathode tube (KC230T4E—4 mm in diameter×230 mm in length, produced by Matsushita Electric Co., Ltd.) used as a light source was disposed on the remaining end surface of the light conductor by covering with a silver-deposited PET film. A plurality of parallel prism arrays were formed of ultraviolet ray curable acrylic resin having a refractive index of 1.53 on a PET film so as to have an apex angle of 63 degrees and a pitch of 50 micrometers to form a prism sheet. The prism sheet thus formed was disposed on the light emitting face of the light conductor so that the prism face confronted the light emitting face side of the light conductor, thereby fabricating a surface light source device. The normal brightness of the surface light source device thus fabricated was measured, and the measurement results are shown in Table 2.

Further, a light conductor was formed in the same manner as described above by using a transparent acrylic resin plate of 3 mm×90 mm×300 mm in size. The surface light source device was fabricated in the same manner as described above, except that a silver-deposited PET film was adhesively attached to each of two 300 mm end surfaces of the light conductor thus constructed. The emission rate and the dispersion rate (R%) of the light conductor of the surface light source device were measured, and the measurement results are shown in Table 2.

EXAMPLE 6

A lens pattern comprising a plurality of lenticular lens arrays of 50 micrometers in pitch which were formed continuously in parallel to one another corresponding to the shape shown in FIG. 5, was formed on a brass plate by using a diamond cutter to form a die. By using the die thus obtained, a lenticular lens face was transferred onto one surface of a transparent acrylic resin plate of 4 mm×210 mm×165 mm in size by the thermal transfer method to form a light conductor. The average slant angle ($\theta$a) of the light conductor thus obtained was equal to 4.3 degrees. A surface light source device was fabricated with the light conductor thus obtained in the same manner as in Example 5. The normal brightness of the surface light source device thus obtained was measured, and the measurement results are shown in Table 2. Further, by using the surface light source device which was constructed with the above light conductor in the same manner as Example 5, the emission rate and the dispersion rate (R%) of the light conductor of the surface light source device were measured, and the measurement results are shown in Table 2.

Comparative Example 4

Figure 12:
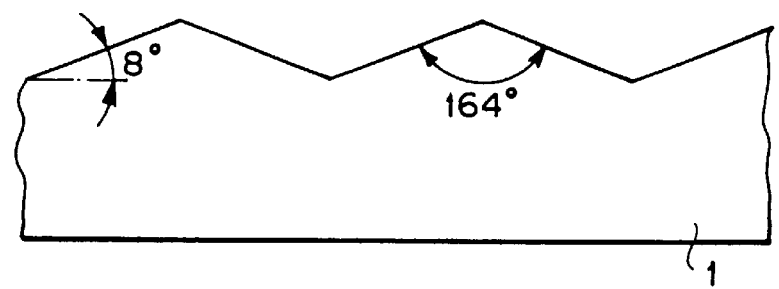
FIG. 12 is a partial cross-sectional view showing a prism surface of a light conductor of a comparative example.

A prism pattern comprising a plurality of prism arrays of 164 degrees in apex angle and 50 micrometers in pitch which were formed continuously in parallel to one another corresponding to the shape shown in FIG. 12, was formed on a brass plate by using a diamond cutter to form a die. By using the die thus obtained, a prism face was transferred onto one surface of a transparent acrylic resin plate of 4 mm×210 mm×165 mm in size by the thermal transfer method to form a light conductor. The average slant angle ($\theta$a) of the light conductor thus obtained was equal to 8.2 degrees. A surface light source device was fabricated with the light conductor thus obtained in the same manner as in Example 5. The normal brightness of the surface light source device thus obtained was measured, and the measurement results are shown in Table 2. Further, by using the surface light source device which was constructed with the above light conductor in the same manner as Example 5, the emission rate and the dispersion rate (R%) of the light conductor the surface light source device were measured, and the measurement results are shown in Table 2.

Comparative Example 5

Figure 13:
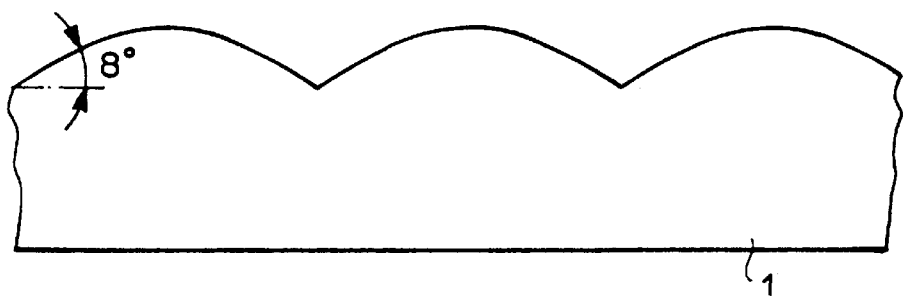
FIG. 13 is a partial cross-sectional view showing a lenticular lens surface of the light conductor of another comparative example.

A lens pattern comprising a plurality of lenticular lens arrays of 50 micrometers in pitch which were formed continuously in parallel to one another corresponding to the shape shown in FIG. 13, was formed on a brass plate by using a diamond cutter to form a die. By using the die thus obtained, a lenticular lens face was transferred onto one surface of a transparent acrylic resin plate of 4 mm×210 mm×165 mm in size by the thermal transfer method to form a light conductor. The average slant angle ($\theta$a) of the light conductor thus obtained was equal to 8.3 degrees. A surface light source device was fabricated with the light conductor thus obtained in the same manner as in Example 5. The normal brightness of the surface light source device thus obtained was measured, and the measurement results are shown in Table 2. Further, by using the surface light source device which was constructed with the above light conductor in the same manner as Example 5, the emission rate and the dispersion rate (R%) of the light conductor of the surface light source device were measured, and the measurement results are shown in Table 2.

As a comparative test, the surface light source devices obtained in Examples 1 to 6 and Comparative Examples 1 to 5 were used as back lights for a liquid crystal display device. In the case of the surface light source devices of Examples 1 to 6, a very light and uniform liquid crystal display image frame was obtained. On the other hand, in case of the surface light source devices of Comparative Examples 1 to 5, a relatively light image frame was observed in the neighborhood of the light source. However, the reduction in lightness became disadvantageously more noticeable farther away from the light source.

EXAMPLE 7

In the same manner as Example 1, the roughened surface was transferred onto one surface of a transparent acrylic resin plate of 10 mm thick and 600 mm×1250 mm in area by the thermal transfer method to form a light conductor. The average slant angle (θa) and the occupation rate of the areas having a minute average slant angle (Δθa) of 20 degrees or more of the light conductor thus formed were measured, and the measurement results are shown in Table 3. The structure and the characteristic of the light emitted from the light conductor were the same as in Example 1. A silver-deposited PET film was adhesively attached to one 600 mm end surface of the light conductor and to two 1250 mm end surfaces of the light conductor, and a silver-deposited PET film was fixed to the back surface confronting the roughened light emitting face by an adhesive tape to form reflection surface. Further, a 30W fluorescent lamp (FSL30T6W, produced by Matsushita Electric Co., Ltd.) was disposed on the remaining 600 mm end surface of the light conductor. A plurality of parallel prism arrays were formed of ultraviolet ray curable acrylic resin having a refractive index of 1.53 on a PET film so as to have an apex angle of 63 degrees and a pitch of 50 micrometers, thereby forming a prism sheet. The prism sheet thus formed was disposed on the light emitting face of the light conductor so that the prism face confronted the light emitting face side of the light conductor, thereby fabricating a surface light source device. The normal brightness of the surface light source device thus fabricated was measured, and the measurement results are shown in Table 3.

Further, a light conductor was formed in the same manner as described above by using a transparent acrylic resin plate of 10 mm thick and 600 mm×1250 mm in area. A silver-deposited PET film was adhesively attached to each of two 1250 mm end surfaces of the light conductor, and a silver-deposited PET film was fixed to the back surface confronting the roughened light emitting face by an adhesive tape to form reflection surface. Further, a 30 W fluorescent lamp (FSL30T6W, produced by Matsushita Electric Co., Ltd.) was disposed on one 600 mm end surface of the light conductor. By using the surface light source device thus fabricated, the emission rate and the dispersion rate (R%) of the light conductor were measured, and the measurement results are shown in Table 3.

Comparative Example 6

In the same manner as Comparative Example 1, the roughened surface was transferred onto one surface of a transparent acrylic resin plate of 10 mm in thickness and 600 mm×1250 mm in area by the thermal transfer method to form a light conductor. The average slant angle (θa) and the occupation rate of the areas having a minute average slant angle (Δθa) of 20 degrees or more of the light conductor were measured, and the measurement results are shown in Table 3. The structure of the roughened surface of the light conductor and the characteristic of the light emitted therefrom were the same as in Comparative Example 1. A surface light source device was fabricated with this light conductor in the same manner as in Example 7. The normal brightness of the surface light source device thus fabricated was measured, and the measurement results are shown in Table 3. By using the surface light source device which was constructed with the above light conductor in the same manner as Example 7, the emission rate and the dispersion rate (R%) of the light conductor were measured, and the measurement results are shown in Table 3.

EXAMPLE 8

In the same manner as Example 5, the prism face was transferred onto one surface of a transparent acrylic resin plate of 10 mm×600 mm×1250 mm in size by the thermal transfer method to form a light conductor. The average slant angle (θa) of the light conductor thus obtained was equal to 4.2 degrees. A silver-deposited PET film was adhesively attached to each of two 1250 mm end surfaces of the light conductor and to one of the other 600 mm end surfaces of the light conductor, and a silver-deposited PET film was fixed to the back surface confronting the light emitting face having the prism face by an adhesive tape to form reflection surface. Further, a 30 W fluorescent lamp (FSL30T6 produced by Matsushita Electric Co., Ltd.) was disposed on the remaining end surface of the light conductor and was wrapped by a silver-deposited PET film.

A plurality of parallel prism arrays were formed of ultraviolet ray curable acrylic resin having a refractive index of 1.53 on a PET film so as to have an apex angle of 63 degrees and a pitch of 50 micrometers, thereby forming a prism sheet. The prism sheet thus formed was disposed on the light emitting face of the light conductor so that the prism face confronted the light emitting face side of the light conductor, thereby fabricating a surface light source device. The normal brightness of the surface light source device thus fabricated was measured, and the measurement results are shown in Table 4.

Further, a light conductor was formed in the same manner as described above by using a transparent acrylic resin plate of 10 mm×600 mm×1250 mm in size. The surface light source device was fabricated in the same manner as described above, except that a silver-deposited PET film was adhesively attached to each of two 1250 mm end surfaces of the light conductor. By using the surface light source device thus fabricated, the emission rate and the dispersion rate (R%) of the light conductor were measured, and the measurement results are shown in Table 4.

EXAMPLE 9

In the same manner as Example 6, the lenticular lens face was transferred onto one surface of a transparent acrylic resin plate of 10 mm×600 mm×1250 mm in size by the thermal transfer method to form a light conductor. The average slant angle (θa) of the light conductor thus obtained was equal to 4.3 degrees. A surface light source device was fabricated with the light conductor thus obtained in the same manner as in Example 8. The normal brightness of the surface light source device thus fabricated was measured, and the measurement results are shown in Table 4. Further, the surface light source device was formed with the above light conductor in the same manner as in Example 8, and the emission rate and the dispersion rate (R%) of the light conductor of the surface light source device thus obtained were measured, and the measurement results are shown in Table 4.

Comparative Example 7

In the same manner as Comparative Example 4, the prism face was transferred onto one surface of a transparent acrylic resin plate of 10 mm×600 mm×1250 mm in size by the thermal transfer method to form a light conductor. The average slant angle (θa) of the light conductor thus obtained was equal to 8.2 degrees. A surface light source device was fabricated with the light conductor thus obtained in the same manner as Example 8. The normal brightness of the surface light source device thus fabricated was measured, and the measurement results are shown in Table 4. Further, the surface light source device was formed with the above light conductor in the same manner as Example 8. and the emission rate and the dispersion rate (R%) of the light conductor of the surface light source device thus obtained were measured, and the measurement results are shown in Table 4.

Comparative Example 8

In the same manner as Comparative Example 5, the prism face was transferred onto one surface of a transparent acrylic resin plate of 10 mm×600 mm×1250 mm in size by the thermal transfer method to form a light conductor. The average slant angle (θa) of the light conductor thus obtained was equal to 8.3 degrees. A surface light source device was fabricated with the light conductor thus obtained in the same manner as in Example 8. The normal brightness of the surface light source device thus fabricated was measured, and the measurement results are shown in Table 4. Further, the surface light source device was formed with the above light conductor in the same manner as in Example 8, and the emission rate and the dispersion rate (R%) of the light conductor of the surface light source device thus obtained were measured, and the measurement results are shown in Table 4.

A semi-transparent acrylic plate on which a photograph was printed and alternately a semi-transparent acrylic plate on which a traffic sign was printed were disposed on the surface light source device obtained in Examples 7 to 9 and Comparative Examples 6 to 8 to fabricate a large-size signboard or traffic sign apparatus. In the signboards and the traffic sign apparatus which were formed by using the surface light source devices of Examples 7 to 9 of the present invention, the image was very light and uniform over the whole frame. On the other hand, in the signboards and the traffic sign apparatus which were formed by using the surface light source devices of Comparative Examples 6 to 8, the image was relatively light in the neighborhood of the light source. However, the lightness of the image was quite reduced farther from the light source, and the image was very dark in the neighborhood of the tip end portion of the surface light source device.

Industrial Applicability

According to the present invention, the roughened surface which comprises a plurality of substantially spherical fine convex members having an average slant angle (θa) of 0.5 to 7.5 degrees, or a plurality of lens arrays having slant surfaces whose average slant angle (θa) is equal to 0.5 to 7.5 degrees, is formed on at least one of the light emitting face of the light conductor or the back surface of the light conductor which confronts the light emitting face. Therefore, the surface light source device of the present invention can provide light having high brightness and a uniform brightness distribution within the light emitting face without performing any uniformity treatment using a spot pattern or the like. Therefore, the surface light source device according to the present invention can be suitably applied to a liquid crystal display device for a portable personal computer, a liquid crystal television or the like, or to a display apparatus such as a guide marking board or a large-size signboard in a station or other public facilities, and to a guidepost or traffic sign on a highway road or a general road.

TABLE 1

|  | Ex. 1 | Ex. 2 | Ex. 3 | Ex. 4 | Com. Ex. 1 | Comp. Ex. 2 | Com. Ex. 3 |
| --- | --- | --- | --- | --- | --- | --- | --- |
| L/t | 41.3 | 55 | 41.3 | — | 55 | 41.3 | 55 |
| AVERAGE SLANT ANGLE (θ a) (Degree) | 2.7 | 2.9 | 2.9 | 2.7 | 8.4 | 8.4 | 21.8 |
| RATE OF AREA HAVING Δθa ABOVE 20° (%) | 0 | 0.5 | 0.5 | 0 | 3 | 3 | 4 |
| DISPERSION RATE (R %) (%) | 14 | 19 | 18 | 18 | 163 | 121 | 850 |
| EMISSION RATE (α) (%) | 1.27 | 1.73 | 1.73 | 2.50 | 4.67 | 4.67 | 8.46 |
| NORMAL BRIGHTNESS (cd/cm$^2$) | 2424 | 2074 | 1991 | 2450 | 2324 | 2291 | 2060 |
| MINUTE AVERAGE RADIUS OF CURVATURE (R) (μm) | 206.6 | 255.8 | 255.8 | 206.6 | 69.0 | 69.0 | 49.8 |
| AVERAGE DEVIATION (S) (μm) | 135.0 | 196.7 | 196.7 | 135.0 | 61.1 | 61.1 | 44.9 |
| S/R | 0.657 | 0.769 | 0.769 | 0.657 | 0.886 | 0.886 | 0.902 |
| AVERAGE PERIOD (P) (μm) | 35.1 | 48.8 | 48.8 | 35.1 | 28.6 | 28.6 | 37.0 |
| R/P | 5.86 | 5.20 | 5.20 | 5.86 | 2.41 | 2.41 | 1.35 |
| PEAK ANGLE (Degree) | 71 | 70 | 70 | 71 | 63 | 63 | 67 |
| ANGULAR DIFFERENCE OF 50% LIGHT INTENSITY (Degree) | 15 | 16 | 16 | 15 | 26 | 26 | 23 |
| ANGULAR DIFFERENCE OF 10% LIGHT INTENSITY (Degree) | 32 | 47 | 47 | 32 | 51 | 51 | 62 |

TABLE 2

|  | Ex. 5 | Ex. 6 | Com. Ex. 4 | Com. Ex. 5 |
| --- | --- | --- | --- | --- |
| L/t | 41.3 | 41.3 | 41.3 | 41.3 |
| AVERAGE SLANT ANGLE (θ a) (Degree) | 4.2 | 4.3 | 8.2 | 8.3 |
| DISPERSION RATE (R %) (%) | 17 | 18 | 110 | 115 |
| EMISSION RATE (α) (%) | 1.61 | 1.61 | 4.15 | 4.15 |

TABLE 2-continued

|  | Ex. 5 | Ex. 6 | Com. Ex. 4 | Com. Ex. 5 |
|---|---|---|---|---|
| NORMAL BRIGHTNESS (cd/cm$^2$) | 2303 | 2327 | 2176 | 2240 |

TABLE 3

|  | Ex. 7 | Com. Ex. 6 |
|---|---|---|
| L/t | 125 | 125 |
| AVERAGE SLANT ANGLE (θ a) (Degree) | 2.7 | 8.4 |
| RATE OF AREA HAVING Δ θ a ABOVE 20° (%) | 0 | 3 |
| DISPERSION RATE (R %) (%) | 180 | 650 |
| EMISSION RATE (a) (%) | 3.40 | 9.10 |
| NORMAL BRIGHTNESS (cd/cm$^2$) | 397 | 345 |
| MINUTE AVERAGE RADIUS OF CURVATURE (R) (μm) | 206.6 | 69.0 |
| AVERAGE DEVIATION (S) (μm) | 135.0 | 61.1 |
| S/R | 0.657 | 0.886 |
| AVERAGE PERIOD (P) (μm) | 35.1 | 28.6 |
| R/P | 5.86 | 2.41 |
| PEAK ANGLE (Degree) | 71 | 63 |
| ANGULAR DIFFERENGE OF 50% LIGHT INTENSITY (Degree) | 15 | 26 |
| ANGULAR DIFFERENCE OF 10% LIGHT INTENSITY (Degree) | 32 | 51 |

TABLE 4

|  | Ex. 8 | Ex. 9 | Com. Ex. 7 | Com. Ex. 8 |
|---|---|---|---|---|
| L/t | 125 | 125 | 125 | 125 |
| AVERAGE SLANT ANGLE (θ a) (Degree) | 4.2 | 4.3 | 8.2 | 8.3 |
| DISPERSION RATE (R %) (%) | 170 | 180 | 630 | 670 |
| EMISSION RATE (α) (%) | 3.20 | 3.20 | 8.10 | 8.30 |
| NORMAL BRIGHTNESS (cd/cm$^2$) | 352 | 360 | 308 | 315 |

What is claimed is:

1. A surface light source device comprising:
   a light source;
   a light conductor which has a light incident face on at least one side end surface thereof which confronts said light source, and a light emitting face on one surface thereof which is substantially perpendicular to said light incident face; and
   a light angle varying sheet which is disposed at a side of said light emitting face of said light conductor,
   wherein at least one of said light emitting face and a back surface of said light conductor comprises a minute structure having an average slant angle of 0.5 to 7.5 degrees relative to an average line defined by said one of said light emitting face and said back surface.

2. The surface light source device as claimed in claim 1, wherein said light angle varying sheet comprises a lens sheet having a plurality of lenses which are formed parallel to one another on at least one surface thereof.

3. The surface light source device as claimed in claim 2, wherein said lens sheet is a prism sheet having a plurality of prisms which are formed parallel to one another on at least one surface thereof.

4. The surface light source device as claimed in claim 1, wherein said minute structure comprises a roughened surface which includes a plurality of fine convex members each having a substantially spherical surface, and said roughened surface includes areas which have a minute average slant angle of 20 degrees or more at an occupation rate of 2% or less.

5. The surface light source device as claimed in claim 1, wherein said minute structure comprises a plurality of lens arrays having slant surfaces which extend parallel to said light incident face and which have an average slant angle of 0.5 to 7.5 degrees.

6. The surface light source device as claimed in claim 5, wherein said lens arrays comprise prism arrays.

7. The surface light source device as claimed in claim 5, wherein said lens arrays comprise lenticular lens arrays each having an arcuate shape in section.

8. The surface light source device as claimed in claim 1, wherein the light emission rate from said light emitting face of said light conductor is set to 1% to 4.5%.

9. The surface light source device as claimed in claim 1, wherein a peak light having a maximum light intensity which is emitted from said light emitting face of said light conductor is emitted at an angle of 65 degrees or more with respect to a normal to said light emitting face.

10. The surface light source device as claimed in claim 1, wherein an intersecting angle between a direction of a peak light having a maximum intensity emitted from said light emitting face of said light conductor and a direction of light having 50% of the maximum light intensity is equal to 20 degrees or less.

11. The surface light source device as claimed in claim 1, wherein said light conductor is designed so that a ratio (L/t) of a length (L) from the light incident face to an end face confronting said light incident face and a thickness (t) of said light conductor is set to 200 or less.

12. A display apparatus, comprising the surface light source device as claimed in claim 1 as a back light.

13. The display apparatus as claimed in claim 12, wherein a dispersion rate (R%) of the brightness of light emitted from said light emitting face of said light conductor is set to 450% or less.

14. The display apparatus as claimed in claim 13, wherein the display apparatus is a traffic sign display apparatus.

15. The display apparatus as claimed in claim 12, wherein the display apparatus is a sign display apparatus.

16. The display apparatus as claimed in claim 15, wherein the dispersion rate (R%) of the brightness of light emitted from said light emitting face of said light conductor is set to 250% of less.

* * * * *